United States Patent [19]

Levene et al.

[11] 4,134,746
[45] Jan. 16, 1979

[54] METHOD OF STRENGTHENING GLASS ARTICLES

[75] Inventors: Leon Levene, Thornhill; R. Wayne McClung, Cambridge, both of Canada

[73] Assignee: Domglas Inc., Mississauga, Canada

[21] Appl. No.: 858,217

[22] Filed: Dec. 7, 1977

[30] Foreign Application Priority Data

Aug. 18, 1977 [CA] Canada .................................. 285170

[51] Int. Cl.² ...................... C03C 15/00; C03B 27/00; C09K 50/00
[52] U.S. Cl. ........................................ 65/30 E; 65/31; 65/114; 65/116; 252/79.3; 252/79.4
[58] Field of Search .................. 65/30 E, 31, 114, 116; 252/79.3, 79.4

[56] References Cited

U.S. PATENT DOCUMENTS

| 3,310,495 | 3/1967 | Masuda et al. ................. 252/79.3 X |
| 3,374,130 | 3/1968 | Junge et al. ..................... 252/79.3 X |
| 3,782,915 | 1/1974 | Filbert et al. ......................... 65/31 X |
| 3,844,754 | 10/1974 | Grubb et al. ......................... 65/30 E |

Primary Examiner—S. Leon Bashore
Assistant Examiner—Frank W. Miga
Attorney, Agent, or Firm—Rogers, Bereskin & Parr

[57] ABSTRACT

This invention is directed to a process for strengthening glass articles and, in particular, glass containers such as beer bottles. The invention is directed to a process whereby the article is sprayed over its surface with a solution containing potassium fluoride and a metal acetate which prevents etching of the surface by the fluoride ions. The article is then treated at an elevated temperature to allow exchange of the potassium ions for the sodium ions in the glass.

10 Claims, 2 Drawing Figures

METHOD OF STRENGTHENING GLASS ARTICLES

This invention relates to a process for strengthening glass articles and, in particular, for strengthening glass containers.

It is known that the surface of glass articles can be strengthened by producing a compressive stress layer at the surface of the article. One common method of achieving this is known as chemical tempering. Chemical tempering creates a compressive stress at the surface primarily by a chemical alteration of the surface region of the article.

One method of chemical tempering involves the exchange of ions at the surface of the glass. An ion is made available in a substantial concentration at the surface of the article and diffuses into the glass article by a series of ion exchange reactions. The most common form of ion exchange presently in use involves the exchange of larger ions, such as potassium ions, for the sodium ions present in the glass.

Ion exchange reactions can be practiced in two basically different ways. Firstly, the exchange can take place in a temperature region where the glass can relax to accommodate the new ion introduced by the exchange. Secondly, exchange at lower temperatures can be practiced whereby the glass structure cannot relax. The first type of exchange must be done in temperature regions where stress relaxation is quite rapid. Thus, it is often referred to as exchange above the strain point, or high temperature exchange. Development of compressive stresses by the second method is possible only if the rate of stress build up by exchange is greater than the rate of stress relaxation at the temperature used, so that the exchange is done at lower temperatures than in the first method. Since the rate of exchange, as well as the rate of stress relaxation, increases as the temperature increases, the second type of exchange can be practiced at temperatures as high as the annealing point of the glass. This type of exchange is referred to as exchange below the annealing point or low temperature exchange.

There are two competing reactions which determine the final strength developed in a glass substrate following an ion exchange reaction. The first is the stress-build up due to ion exchange. This is directly related to the diffusion of potassium into the glass and is a function of such properties as substrate composition, treatment temperature, duration of heat treatment, etc. The diffusion rate is temperature dependent, increasing exponentially with temperature.

The second competing reaction is the stress release brought about as a result of the glass structure relaxing during the exchange to accommodate the larger potassium anion. This relaxation is more pronounced at higher temperatures.

Below the strain point, the stress release is minimal because the glass is quite viscous. As the temperature of the glass increases, the viscosity decreases dramatically. At the strain point stress release becomes evident and increases quickly with temperature until at the annealing point all stress is relieved within a few seconds. The compression stresses developed due to ion exchange are in competition with stress relaxation due to annealing. In order to obtain strength improvements, stress generation must predominate over stress relaxation.

One of the earlier methods of chemical tempering is described in U.S. Pat. No. 3,218,220 which issued to Weber on Nov. 16, 1965 and involves the process whereby potassium ions are substituted for sodium ions at the surface of the article. Since potassium ions are larger than sodium ions this places the surface under compression. However, this exchange is accomplished by immersing the article in a molten potassium salt bath. It will be appreciated that this method does not lend itself readily to the modern mass production of containers in present day plants.

Still another method is described in U.S. Pat. No. 3,473,906 which issued to P. W. L. Graham on Oct. 21, 1969 and involves applying an aqueous solution of dipotassium hydrogen orthophosphate to the surface of a newly formed container and then transferring the container to an annealing station to provide for the ion exchange reaction.

Another method of accomplishing chemical tempering is described in U.S. Pat. No. 3,607,172 which issued to J. P. Poole et al. on Sept. 21, 1971. This method involves the strengthening of glass articles by spraying the surfaces thereof with an aqueous solution of tripotassium phosphate at a temperature slightly below the strain point of the glass and holding the glass at such a temperature for a period of time sufficient to exchange potassium ions for sodium ions present in the glass surface.

It is known that aqueous solutions of potassium fluoride can be used to provide a compression layer which is very deep and intense. However, this treatment results in severely etched surfaces, making such treated bottles unacceptable for commercial utilization.

It has now been found that certain agents, when added to the potassium fluoride solutions, prevent etching of the glass surface but do not interfere with the ion exchange process.

Accordingly, the present invention comprises a process for strengthening the surface of an article of a soda-lime glass in which a solution of potassium fluoride containing a sufficient quantity of a metal acetate which prevents etching of glass by the fluoride ions is applied to the surface of the article at a temperature in the range of from 200° F to 900° F, the article is maintained at an elevated temperature below the strain point of the glass to provide an exchange of potassium ions for the sodium ions in the glass to a depth sufficient to produce a substantial compressive surface layer, the article is cooled and washed to remove any residue from the surface.

It is quite surprising that potassium fluoride provided such satisfactory compression layers since potassium chloride, when used in ion exchange reactions, produced very shallow, low order compression layers as did potassium bromide and potassium iodide. In the latter three cases there was no etching but the compression layers were of very low order.

As will be apparent to those skilled in the art, the etching which results when potassium fluoride is used cannot be tolerated in an industrial operation.

Tests were then carried out to determine whether the beneficial effects of potassium fluoride treatment could be retained while avoiding the undesirable effect of etching. It was found that by adding certain compounds to the solution, etching could be avoided. Among those compounds found to be effective were strong Lewis acids, such as $BF_3$, $AsF_5$, $SbF_5$, $ZnCl_2$, $TiCl_4$, and $SnCl_4$. These compounds should be used in substantially stoichiometric amounts in respect to the potassium fluoride.

When the stoichiometry is altered in such a way as to produce an excess of potassium fluoride in the solution, the surface of the glass is severely etched during the ion exchange reaction. Thus, the molar ratio of Lewis acid to potassium fluoride is critical. It has unexpectedly been found that certain metal acetates, e.g., copper acetate, magnesium acetate, nickel acetate and zinc acetate, can be added to the potassium fluoride solutions in small amounts and intense compression layers can be produced without etching even when the molar ratio of potassium fluoride to metal acetate is in the range of from 10 to 400 : 1, with the preferred ratio being in the range of from 150 to 160 : 1. The Lewis acids, as described above, do not prevent etching at these low molar ratios.

It will be appreciated by those skilled in the art that the aqueous solution should not be sprayed on the surface of the container when the surface temperature is such that one of the components of the aqueous solution decomposes. Thus a judicious choice for the temperature at which the solution is sprayed must be made.

The composition of the glass used in the following Examples is given below in Table 1, both for the rods and the amber bottles.

TABLE I

| Glass Composition | Flint Rods | (% by weight) Amber Bottles |
|---|---|---|
| Silica ($SiO_2$) | 69.4 | 71.9 |
| Alumina ($Al_2O_3$) | 2.46 | 2.05 |
| Calcia (CaO) | 5.72 | 10.65 |
| Magnesia (MgO) | 3.72 | 0.65 |
| Sodia ($Na_2O$) | 15.99 | 14.14 |
| Potassia ($K_2O$) | 0.49 | 0.36 |
| Sulphate ($SO_3$) | 0.18 | 0.03 |
| Other oxides | 2.04 | 0.22 |

Figure 1:
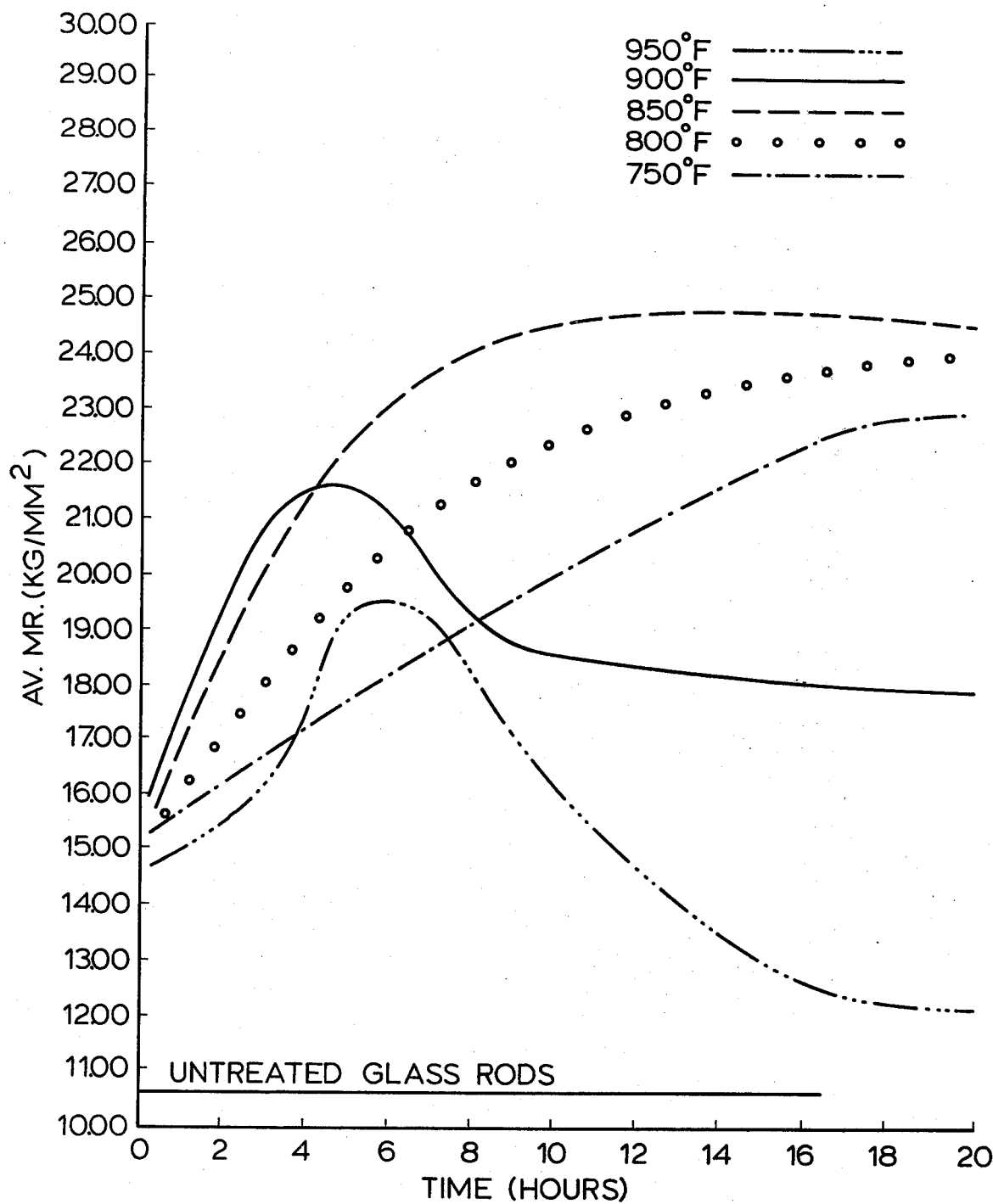
FIG. 1 illustrate the average modulus of rupture (M.R.) value with respect to time.

The present invention will be better understood with reference to the following examples.

EXAMPLE 1

The glass rods used in the following strength measurement tests were first abraded with 600 mesh silicon carbide in water to obtain uniform surfaces. The rods were ball-milled at 75 RPM for 15 minutes, washed with water and rinsed with acetone. The rods were then heated to 800° F for 60 minutes, then sprayed with an aqueous solution prepared by mixing potassium fluoride dihydrate (155 grams, 1.65 moles) in water (80.8 grams) with a solution of zinc acetate dihydrate (2.41 grams, 0.011 moles) in water (10 grams). The resultant solution had a potassium to zinc molar ratio of 150 to 1 and contained 63% by weight of potassium fluoride dihydrate. The conditions relating to coating application were kept constant to ensure uniform powder deposits on the glass rods. The powder deposits were applied by removing the rods, one at a time, from the furnace at the 800° F temperature and placing the rod into a revolving chuck. The rod was then sprayed for a period of 4 seconds which was precisely controlled by a solenoid valve operated by a timer. This was the time required to deposit a thick powder coating. The coated rods were then placed in an oven preheated to 215° F. The rods were suspended from a bar by clips to ensure that the powder deposits on the surfaces of the rods were not damaged.

The coated rods were kept in the 215° F oven until all the rods of the group had been coated and the heat treating furnace was at the desired experimental temperature. Normally 30 rods were used during each evaluation. Any strength improvements due to ion exchange at 215° F would be minimal. Treatment temperatures were 750° F, 800° F, 850° F, 900° F, and 950° F for time periods of from 20 minutes to 20 hours. After heat treatment the rods were removed all at once and allowed to air cool to room temperature. The residual powder deposits were removed by washing prior to strength measurements.

In all cases the surfaces of the rods were not etched. Rods treated in the same manner with potassium fluoride dihydrate solutions containing no zinc acetate had essentially identical compression layers but their surfaces were severely etched.

Each rod was broken in a 4 point loading Instron testing apparatus in order to measure the modulus of rupture. From the 30 rods tested, the average strengths were determined. From sections of the broken rods, thin slices (0.15 to 0.16 mm) were cut for analysis of the compression level. The stress level and the layer depth were measured under a polarizing microscope.

The untreated, as received, glass rods used initially in these experiments had an average modulus of rupture (M.R.) value of 17.1 kg/mm$^2$ with an unacceptable high standard deviation of 3.0. The average M.R. value following abrasion was reduced to 10.5 kg/mm$^2$ with an acceptable standard deviation of 1.2 being obtained. The latter value of 10.5 kg/mm$^2$ is a standard untreated value to which all treated rods will be compared. The M.R. values and compression depths for the complete series are shown in FIGS. 1 and 2.

The strain point of these glass rods was 900 ± 10° F and the annealing point was 970 ± 10° F.

It is apparent from the data presented in FIG. 1 that stress relaxation predominates over stress generation when ion exchange takes place at or above the strain point of the glass (900° F) after a 4 to 6 hour heat treatment. During the initial heat treatments at these temperatures, stress generation predominated over stress relaxation and strength improvements of about 100% were developed. For heat treatment significantly below the strain point, stress generation predominates even after 20 hours. However, as can be seen for the 850° F heat treatment, stress release and stress generation are about equivalent after some 10 hours. In the case of the 750 and 800° F heat treatments, stress generation is predominant for the first 15 to 17 hours after which it becomes equivalent to stress relaxation, with no evidence of stress release overtaking stress generation at these temperatures.

Figure 2:
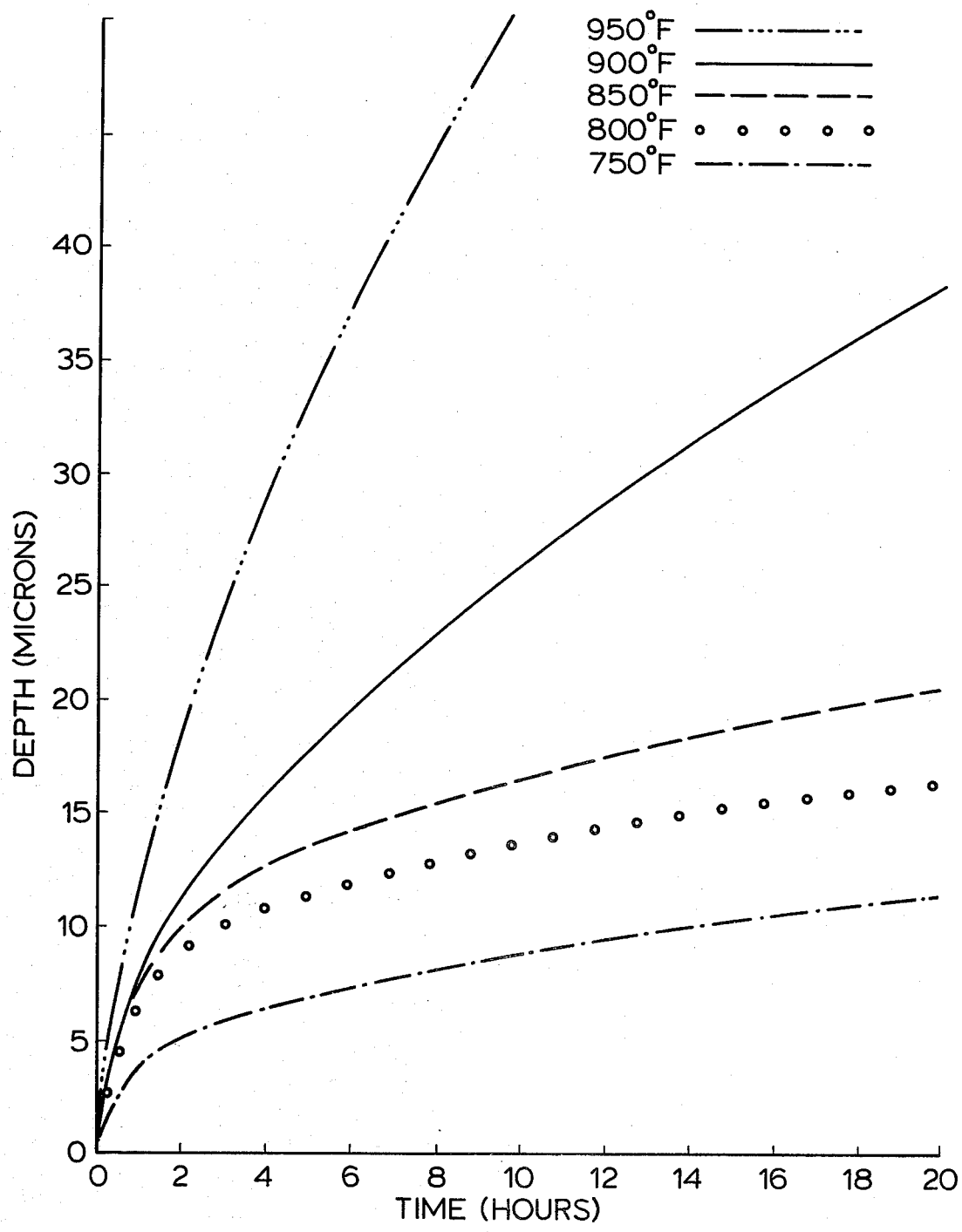
FIG. 2 illustrate compression dept penetration with respect to time.

In FIG. 2 are shown the compression depths which are developed by heat treatment at various temperatures as a function of time. For any given time, penetration of potassium ions into glass substrates is more pronounced at higher temperatures. The higher the temperature, the faster the diffusion and so the deeper the compression layer.

Although a given depth of exchange may be obtained more quickly by carrying out the exchange at a higher temperature, above a certain temperature stress relaxation is rapid enough that stress developed is lower than the stress would be if the exchange were done at lower temperatures. As can be seen from these Figures, although the stress depth increases dramatically with increasing temperatures, the magnitude of the stress peaks after approximately 4 hours (for 900° F treatment) and then decreases. Rods treated at lower temperatures, however, develop higher stresses although stress depths are lower.

It should be noted that the plots in FIG. 2 are not straight lines; all start with steep slopes and decrease slowly at high temperature treatments. Slopes drop dramatically for the lower heat treatments. As the glass matrix is more fixed at the lower temperature, migration of the potassium ion is more difficult resulting in thinner compression layers. At higher temperatures, especially near the strain point, migration is very rapid.

EXAMPLE 2

A solution was prepared by dissolving potassium fluoride dihydrate (61.9 grams, 0.66 moles) in water (20 grams). A second solution was prepared by dissolving nickel acetate tetrahydrate (1.09 grams, 0.0044 moles) in water (16.3 grams). The two solutions were mixed producing a clear solution having a potassium to nickel molar ratio of 150 to 1.

Clean rods were heated to 750° F and sprayed with the clear solution as described in Example 1. The coated rods were subjected to a heat treatment at 750° F for 45 minutes. The surfaces of the rods were not etched. Compression layers of from 3–5 $\mu m$ were obtained with an average strength of 12 kg/mm$^2$ (quartz wedge).

EXAMPLE 3

A solution was prepared as described in Example 2 with the exception that the nickel acetate tetrahydrate was replaced by copper acetate monohydrate (0.88 grams, 0.0044 moles). The solution had a potassium to copper molar ratio, of 150 to 1. Treated rods, as described in Example 2, were not etched and had compression layers averaging 11.5 kg/mm$^2$ which were 3–5 $\mu m$ deep.

EXAMPLE 4

Experiments were also carried out using glass bottles which were coated by spraying or dipping and then heat treated in a standard production lehr in order to develop the required compression layers.

Freshly produced 12 ounce amber beer bottles were sprayed at 300° F with an aqueous solution prepared by mixing potassium fluoride dihydrate (1400 grams, 14.8 moles) in water (400 grams) with a second solution containing zinc acetate dihydrate (21.8 grams, 0.099 moles) in water (72 grams). The resultant solution had a potassium to zinc molar ratio of 150 : 1 and contained 74% by weight of potassium fluoride dihydrate. Both the bottle side walls and bottoms were coated. The coated bottles were passed through a lehr where they were heat treated at a temperature of between 800° and 900° F for a period of 40 minutes. Following this heat treatment, the bottles were allowed to cool, and were subsequently washed with water in order to remove the residue of powder. The surfaces were not etched.

A series of non-coated, control bottles were heat treated at the same time. Both series of bottles were subjected to internal pressure tests.

The strength of the ion exchanged bottles were 56% higher than the control bottles. Compression layers developed were approximately 10 $\mu m$ thick.

When heat treatments were carried out in lehrs with temperatures above 950° F, the surfaces of the containers were etched.

EXAMPLE 5

The glass used for the manufacture of standard glass containers is known to be a poor ion exchange media and thus only shallow compression layers can be developed during ion exchange reactions under normal production conditions.

It has been estimated that during normal consumer use, damage to the surface is approximately 40 $\mu m$ deep. Therefore ion exchange reactions which would take place under normal production conditions are not suitable commercially. However, highly scratch resistant coatings, for example tin oxide having a lubricious organic material such as low density polyethylene coated thereover, impart to the glass surface sufficient protection for commercial use. This process is described, for example, in Canadian Pat. No. 853,121 which issued to J. P. Poole et al. on Oct. 6, 1970. Therefore, such a coating in combination with relatively shallow compression layers would be expected to produce high strength serviceable glass containers.

Hot beer bottles were removed just before entering the lehr and placed on a bottle coating apparatus. The bottles at this point had a temperature of 960° F. They were sprayed with a solution containing tin tetrachloride pentahydrate (40 grams) in ethanol (160 grams) in order to produce the tin oxide layer. Coating thicknesses were 50 to 100 Å. The bottles were then allowed to pass through the lehr in order to anneal them. The bottles were removed and placed on the bottle coating apparatus for the second time and sprayed with an identical solution of potassium fluoride dihydrate and zinc acetate dihydrate as described in Example 4. The bottle temperatures at this stage were approximately 300° F. The coated bottles were then transferred to another lehr in order to carry out the ion exchange heat treatment. The second lehr was maintained at a temperature of between 800° and 900° F and heat treatment extended for 40 minutes as described in Example 4. After cooling, residue of powders were removed with water and the bottles re-heated to 300° F at which time they were sprayed with a lubricious organic coating. The organic coating material is similar to that described in the U.S. Pat. No. 3,323,889, which issued on June 6, 1967 to Carl et al. This consists of

|  | Parts |
|---|---|
| Ac polyethylene No. 629 | 40 |
| Oleic acid (U.S.P.) | 11 |
| Potassium hydroxide | 2 |
| Distilled water | 207 |

The following table illustrates the result of this experiment.

TABLE 2

|  | Ion exchange (no SnO$_2$ or lubricious coating | Ion exchange (with SnO$_2$ and lubricious coating |
|---|---|---|
| SnO$_2$ coating thickness | — | 80 CTU |
| Scratch resistance | — | 100 + wet and dry |
| Strength improvements (internal pressure) | 57% | 14% |
| Compression layer thickness | 10 $\mu m$ | 4–5 $\mu m$ |

Strength improvements are dramatically reduced when the ion exchange reaction is carried out through the $SnO_2$ coating under these conditions. However, excellent scratch resistant coatings were produced by this technique. In order to determine the effect of the scratch resistant coating, bottles treated in this manner were subjected to a wet 5 minute line simulation abrasion test. There was no loss in strength following this treatment. The scratch resistant coating effectively protected the thin compression layer. The data for the abraded ware is tabulated below:

TABLE 3

|  | Internal Pressure Value (psi) | |
| --- | --- | --- |
|  | Before Abrasion | After Abrasion |
| Control | 394 | 184 |
| KF + Zn(OAc)$_2$ only | 614 | 217 |
| K$_3$PO$_4$ only | 522 | 232 |
| KF + Zn(OAc)$_2$ plus SnO$_2$-Polyethylene | 432 | 448 |

What we claim is:

1. A process for strengthening the surface of an article of a soda-lime glass in which a solution of potassium fluoride containing a metal acetate which prevents etching of glass by fluoride ions, the ratio of potassium fluoride to metal acetate in the solution being in the range of from 10 to 400:1, is applied to the surface of the article at a temperature in the range of from 200° F to 900° F, the article is maintained at an elevated temperature below the strain point of the glass to provide an exchange of potassium ions for the sodium ions in the glass to a depth sufficient to produce a substantial compressive surface layer, the article is cooled and washed to remove any residue from the surface.

2. A process as claimed in claim 1 in which said metal acetate is selected from the group of copper acetate, magnesium acetate, nickel acetate and zinc acetate.

3. A process as claimed in claim 1 in which said metal acetate is zinc acetate.

4. A process as claimed in claim 2, in which the solution is sprayed onto the article when the surface of the article has a temperature in the range of from 200° F to 400° F.

5. A process as claimed in claim 2, in which the article is maintained at a temperature in the range of 850° F to 900° F for a period of 4 to 5 hours to provide for the exchange of potassium ions.

6. A process as claimed in claim 2, in which the article is maintained at a temperature in the range of 850° to 900° F for a period of 1 to 2 hours to provide for the exchange of potassium ions.

7. A process as claimed in claim 1 in which the solution is applied to the surface which has been coated with tin oxide.

8. A process as claimed in claim 7 in which the article is subsequently coated with polyethylene.

9. A process as claimed in claim 1 in which the molar ratio of potassium fluoride to metal acetate is in the range of 150 to 160 : 1.

10. A process as claimed in claim 2, in which the solution is applied to the surface of the container by spraying.